(12) United States Patent
Wu et al.

(10) Patent No.: US 9,599,107 B2
(45) Date of Patent: Mar. 21, 2017

(54) SYSTEM AND METHOD FOR CONTROLLING A HYDROSTATIC DRIVE UNIT OF A WORK VEHICLE USING A COMBINATION OF CLOSED-LOOP AND OPEN-LOOP CONTROL

(71) Applicant: CNH America, LLC, New Holland, PA (US)

(72) Inventors: Duqiang Wu, Bolingbrook, IL (US); Navneet Gulati, Naperville, IL (US)

(73) Assignee: CNH Industrial America LLC, New Holland, PA (US)

( * ) Notice: Subject to any disclaimer, the term of this patent is extended or adjusted under 35 U.S.C. 154(b) by 378 days.

(21) Appl. No.: 14/162,912

(22) Filed: Jan. 24, 2014

(65) Prior Publication Data

US 2014/0241902 A1    Aug. 28, 2014

Related U.S. Application Data

(60) Provisional application No. 61/768,023, filed on Feb. 22, 2013.

(51) Int. Cl.
*F04B 1/32*      (2006.01)
*F16H 61/425*    (2010.01)
(Continued)

(52) U.S. Cl.
CPC .............. *F04B 49/06* (2013.01); *B60K 6/08* (2013.01); *E02F 9/2253* (2013.01);
(Continued)

(58) Field of Classification Search
None
See application file for complete search history.

(56) References Cited

U.S. PATENT DOCUMENTS 4,587,808 A * 5/1986 Watanabe ............... F04B 49/06
                                                    318/590
5,170,625 A * 12/1992 Watanabe ............ E02F 9/2235
                                                    60/452

(Continued)

*Primary Examiner* — Rami Khatib
*Assistant Examiner* — Jeffrey Boomer
(74) *Attorney, Agent, or Firm* — Peter K. Zacharias; Patrick M. Sheldrake

(57) ABSTRACT

A method for controlling a hydrostatic drive unit of a work vehicle may generally include determining a reference swashplate position of a hydraulic pump of the hydrostatic drive unit, wherein the reference swashplate position is associated with an uncompensated current command, and determining an actual swashplate position of the hydraulic pump, wherein the actual swashplate position differs from the reference swashplate position due to a loading condition of the work vehicle. The method may also include determining a closed-loop current command based a on the actual and reference swashplate positions and generating a modified current command based on the uncompensated current command and/or the closed-loop current command. The modified current command may differ from the closed-loop current command when an operator input is within a predetermined control input range and may be equal to the closed-Loop current command when the operator input is outside the predetermined control input range.

18 Claims, 10 Drawing Sheets

(51) Int. Cl.
  *F04B 49/06* (2006.01)
  *B60K 6/08* (2006.01)
  *E02F 9/22* (2006.01)

(52) U.S. Cl.
  CPC ............ *E02F 9/2289* (2013.01); *F04B 1/324* (2013.01); *F04B 49/065* (2013.01); *F16H 61/425* (2013.01); *F04B 2201/12051* (2013.01)

(56) References Cited

U.S. PATENT DOCUMENTS

| | | | |
|---|---|---|---|
| 5,335,750 A * | 8/1994 | Geringer | B60K 17/10 180/307 |
| 5,996,342 A | 12/1999 | Khan et al. | |
| 6,119,456 A | 9/2000 | Louis et al. | |
| 6,145,455 A * | 11/2000 | Gust | A01C 19/04 111/178 |
| 6,675,577 B2 | 1/2004 | Evans | |
| 7,310,943 B2 | 12/2007 | Burgart et al. | |
| 7,613,560 B2 | 11/2009 | Nishi et al. | |
| 7,630,793 B2 | 12/2009 | Thomas et al. | |
| 7,962,768 B2 | 6/2011 | Grill et al. | |
| 8,414,454 B2 | 4/2013 | Nishi et al. | |
| 2003/0010026 A1 * | 1/2003 | Evans | B60K 17/10 60/443 |
| 2007/0130938 A1 * | 6/2007 | Burgart | F16H 61/42 60/487 |
| 2009/0133951 A1 * | 5/2009 | Schultz | B60W 10/103 180/307 |
| 2009/0222176 A1 | 9/2009 | Florean et al. | |
| 2014/0165549 A1 * | 6/2014 | Gabibulayev | F15B 21/001 60/421 |
| 2014/0283507 A1 * | 9/2014 | Kisselbach | B66C 13/20 60/327 |
| 2015/0191897 A1 * | 7/2015 | Zhang | E02F 9/2217 60/327 |
| 2015/0192149 A1 * | 7/2015 | Ma | F15B 1/0275 60/327 |

* cited by examiner

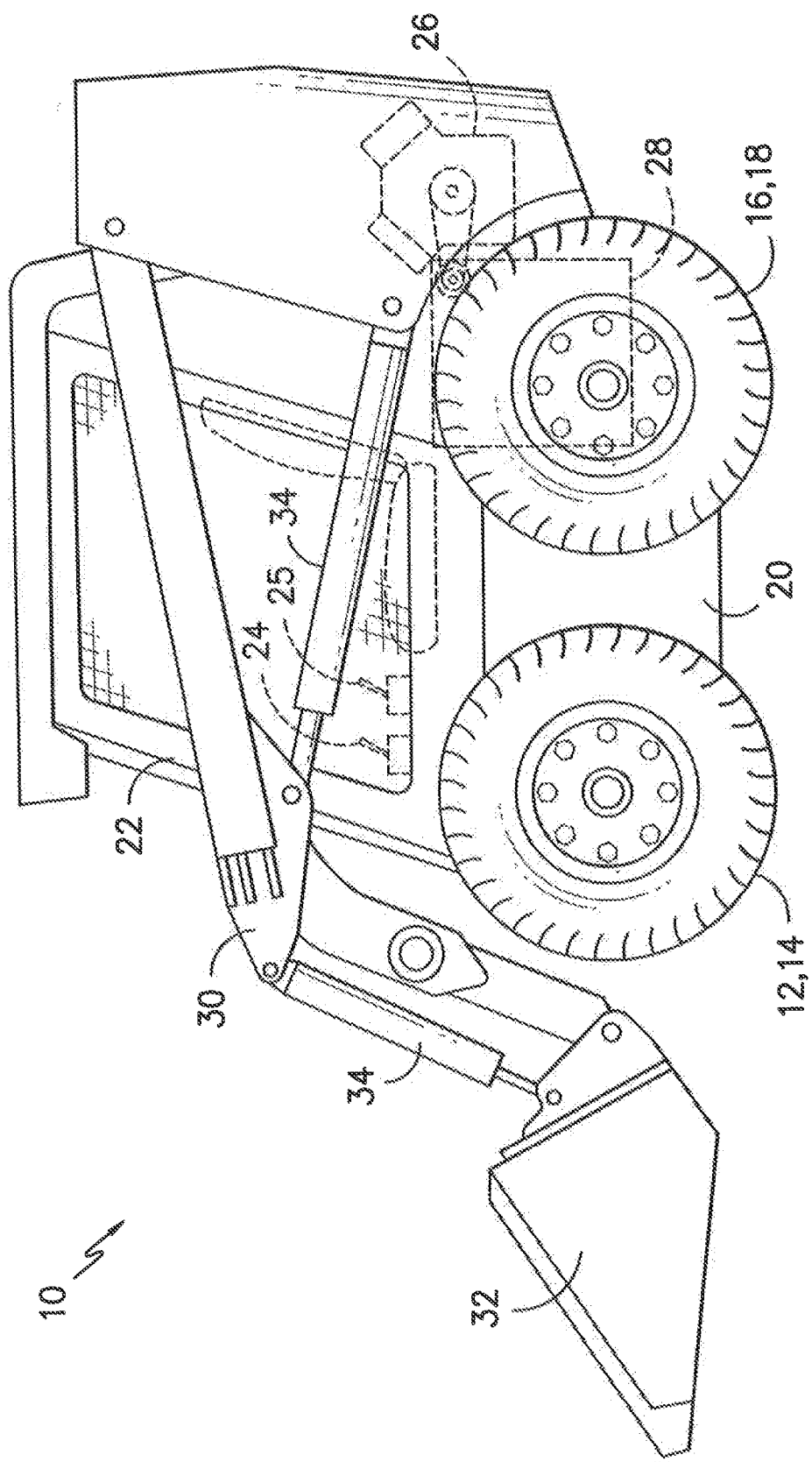

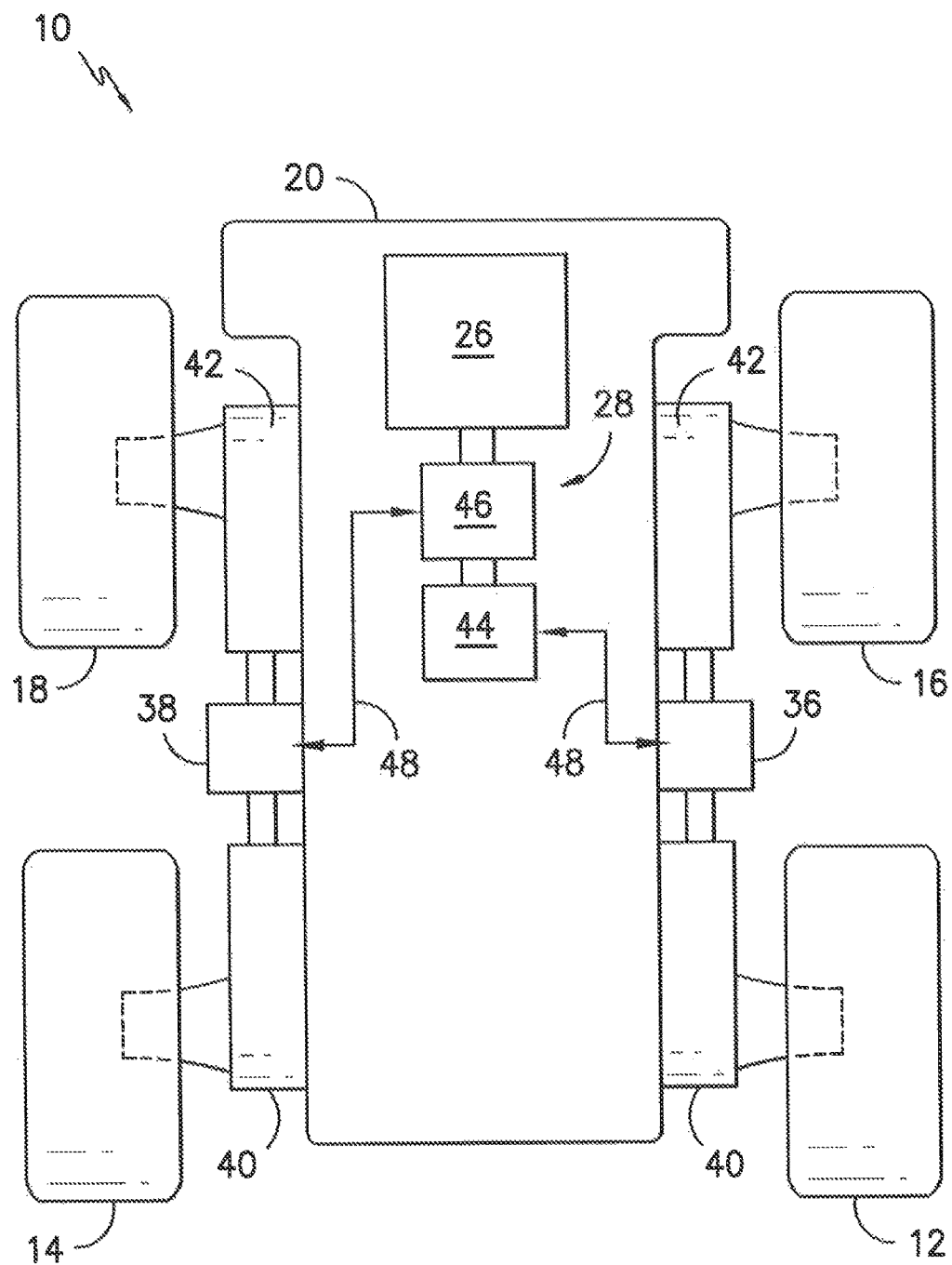
FIG. -2-

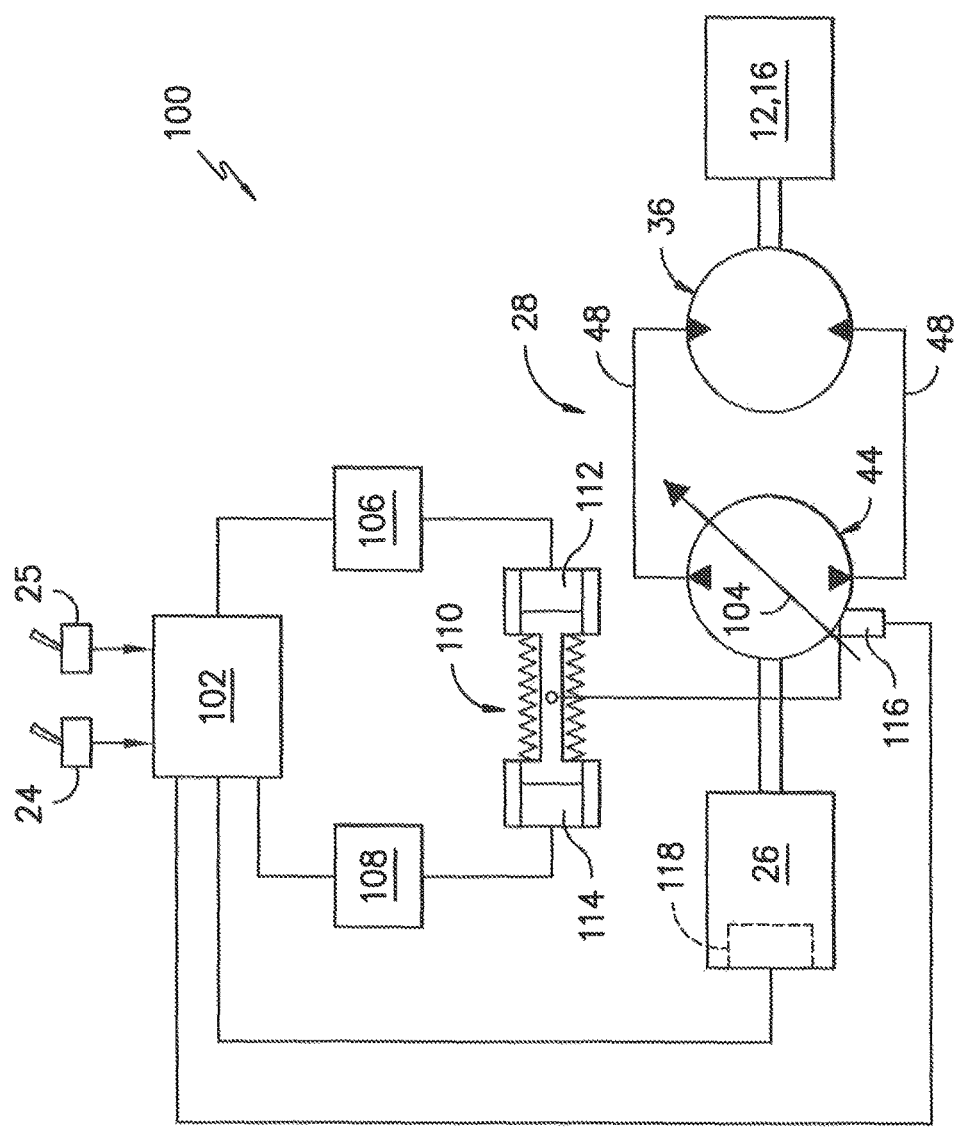
FIG. -3-

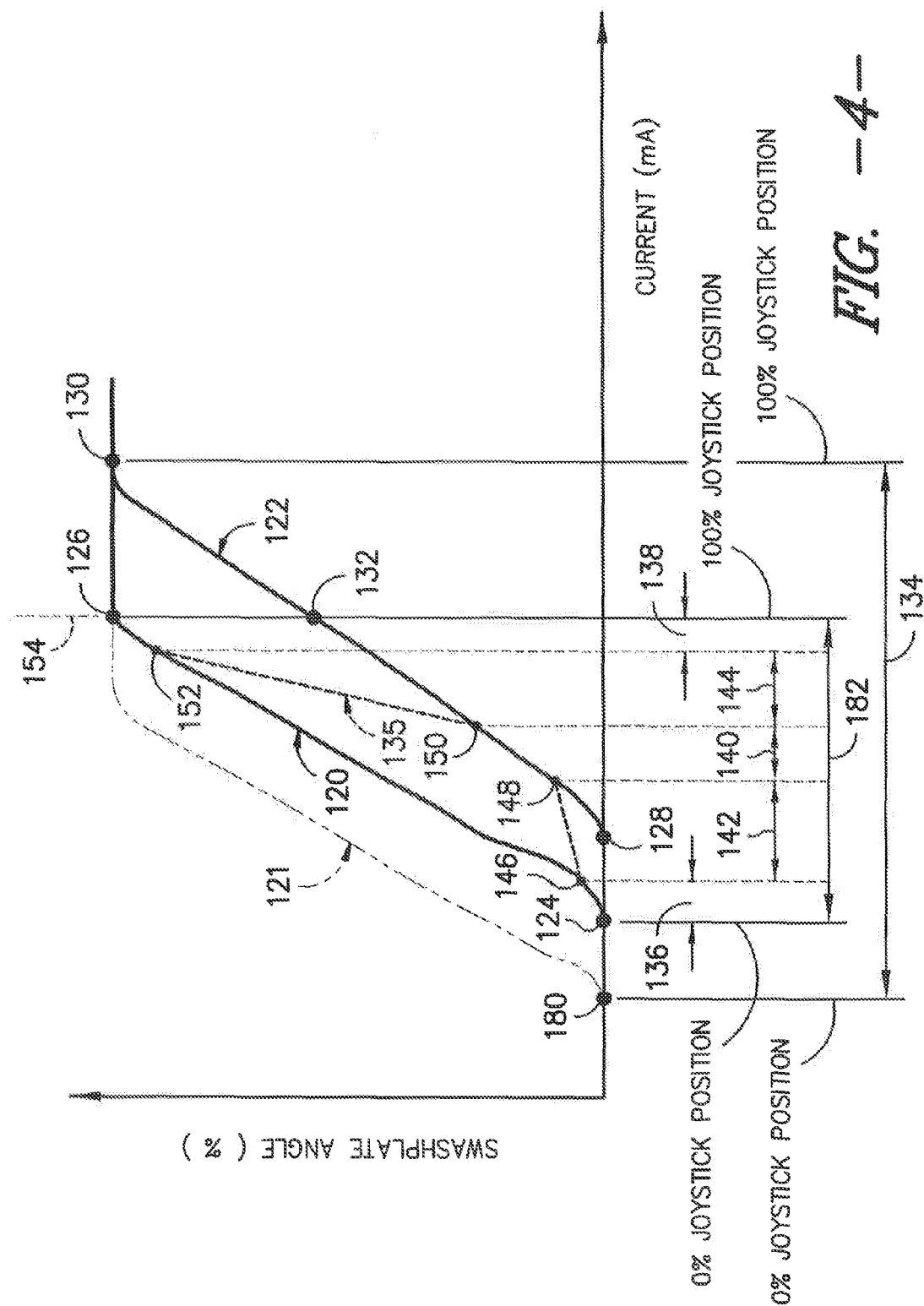
FIG. —4—

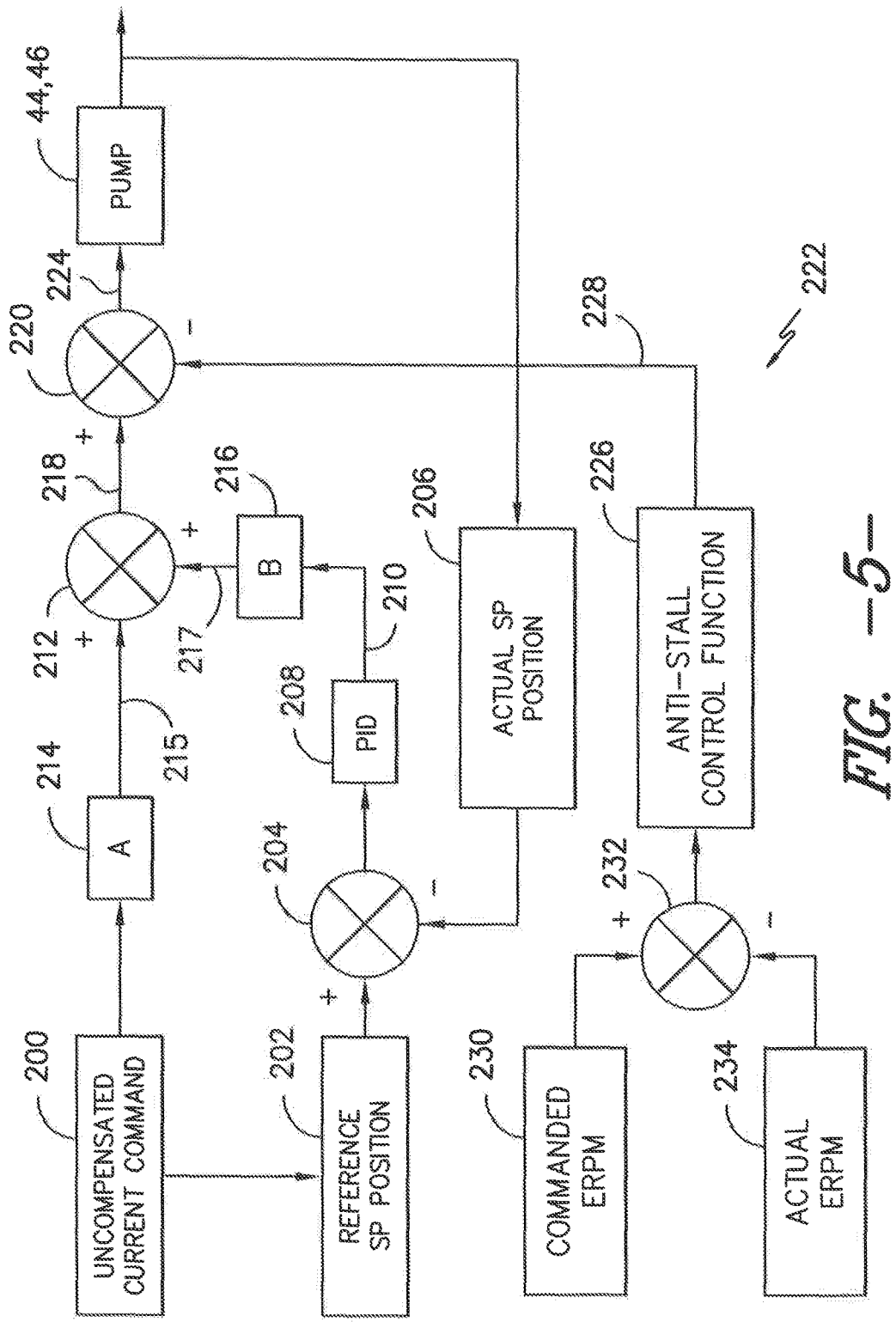
FIG. -5-

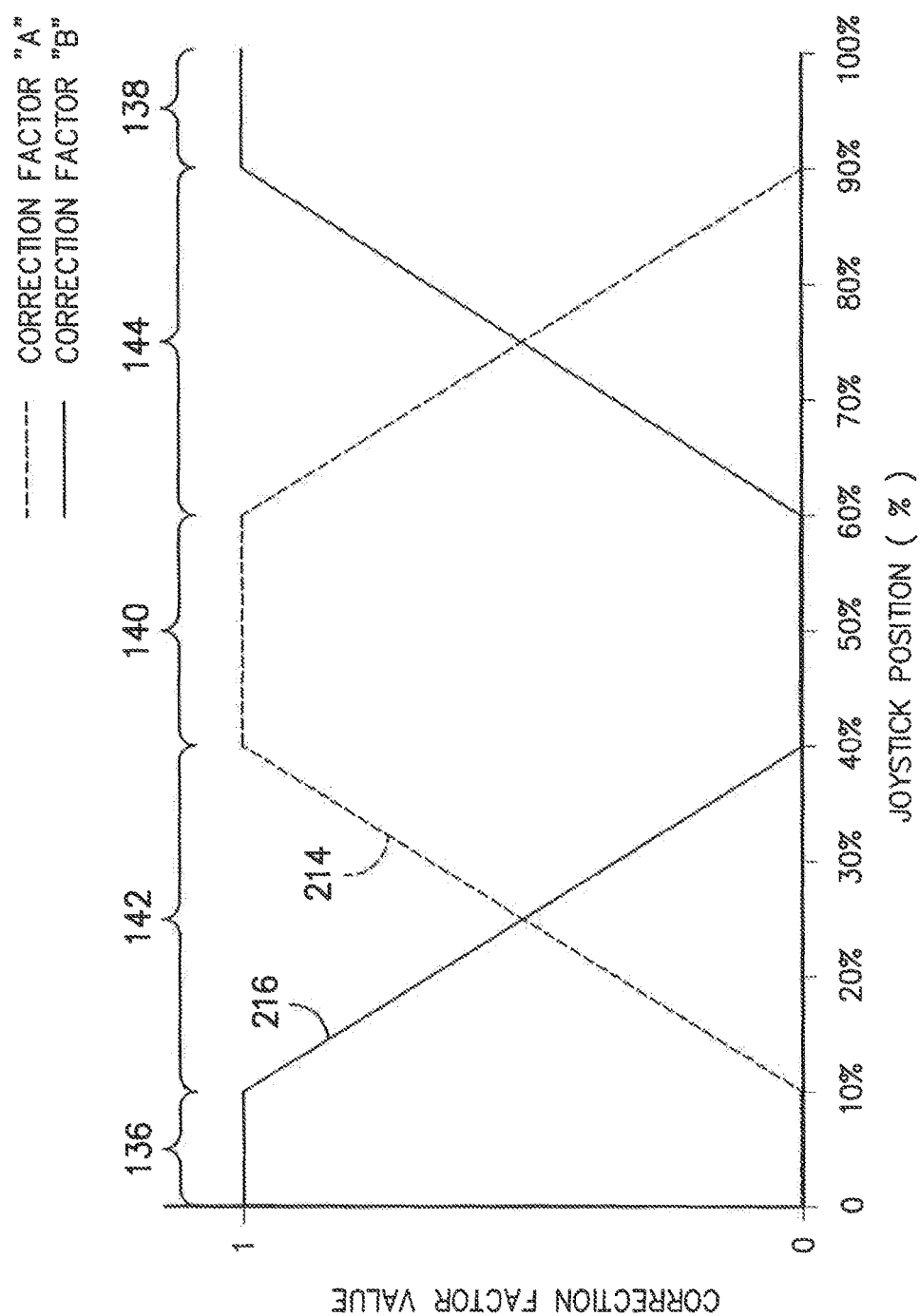
FIG. -6-

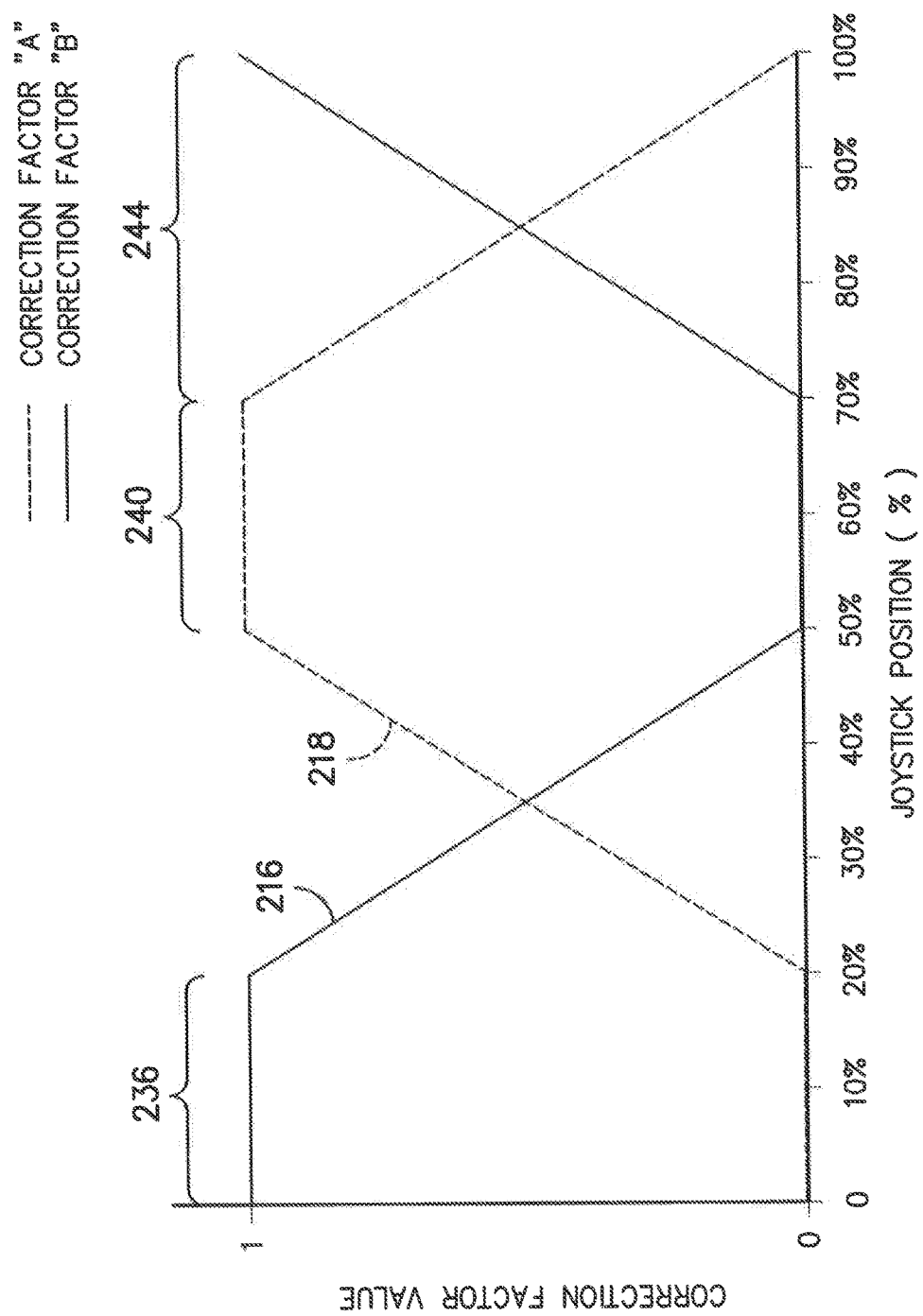
FIG. -7-

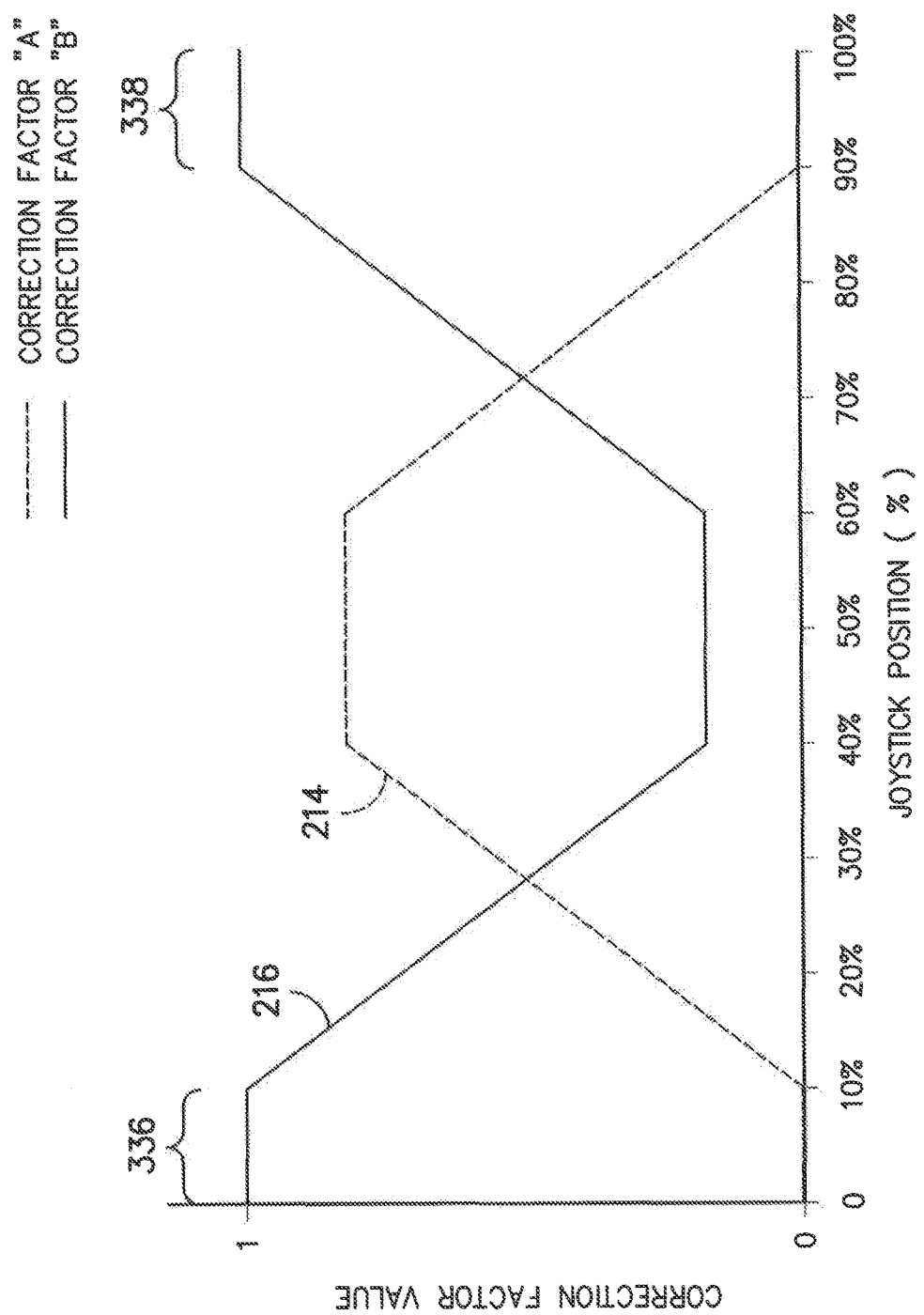
FIG. -8-

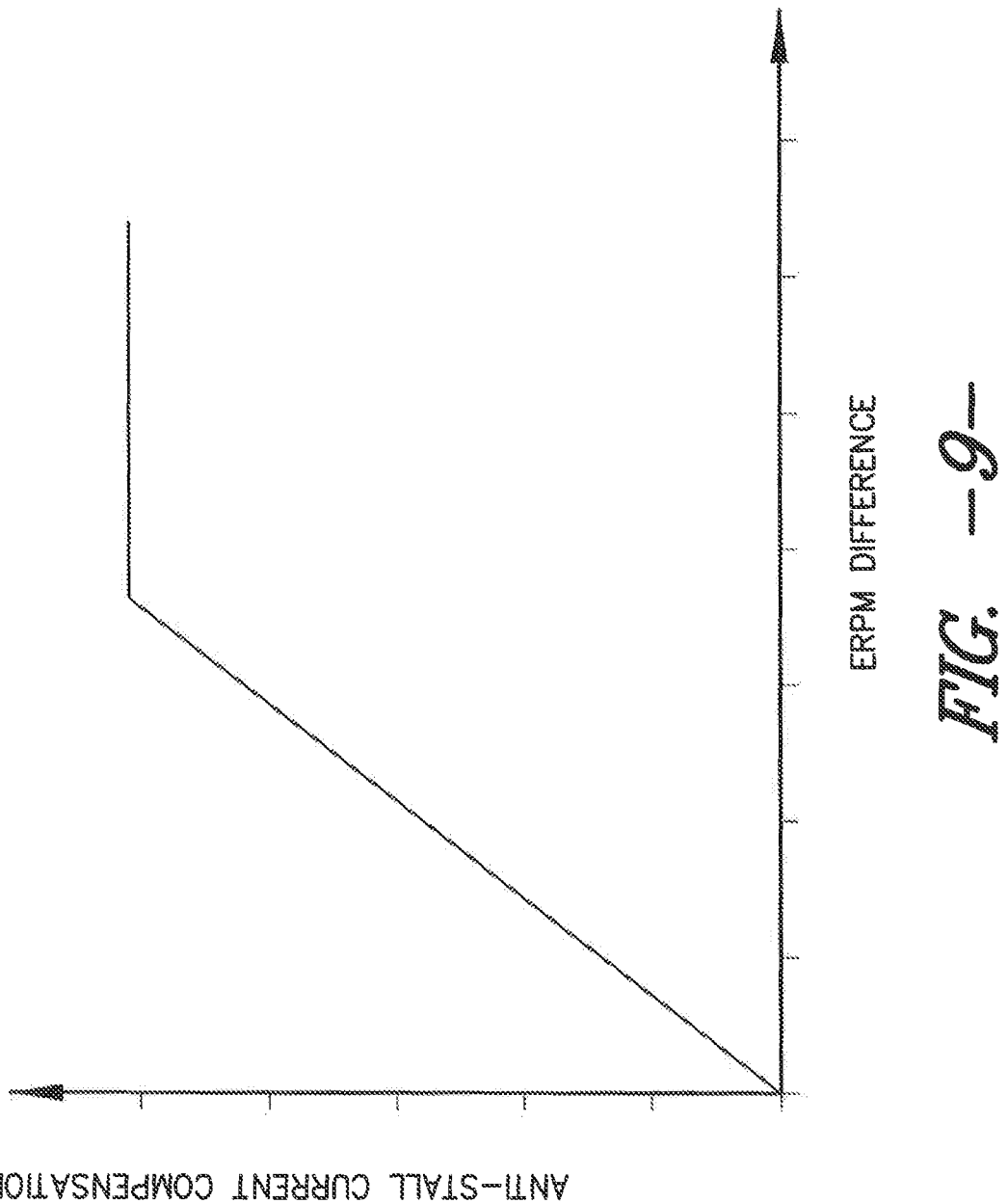
FIG. -9-

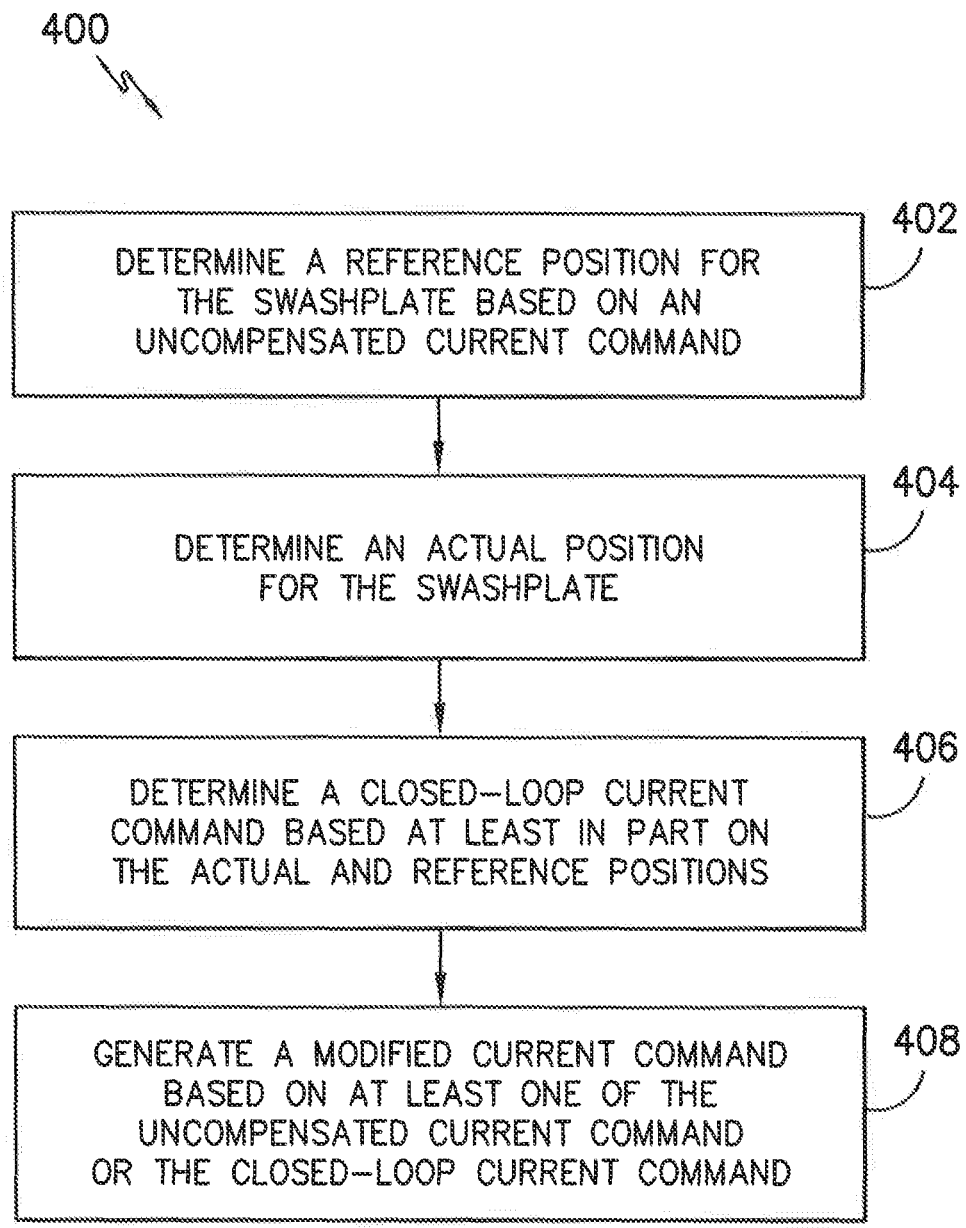
FIG. -10-

SYSTEM AND METHOD FOR CONTROLLING A HYDROSTATIC DRIVE UNIT OF A WORK VEHICLE USING A COMBINATION OF CLOSED-LOOP AND OPEN-LOOP CONTROL

CROSS-REFERENCE TO RELATED APPLICATIONS

This application is based upon and claims priority to U.S. Provisional Application No. 61/768,023, filed on Feb. 22, 2013, the disclosure of which is hereby incorporated by reference herein in its entirety for all purposes.

FIELD OF THE INVENTION

The present subject matter relates generally to work vehicles and, more particularly, to a system and method for controlling a hydrostatic drive unit of a work vehicle using a combination of closed-loop and open-loop control.

BACKGROUND OF THE INVENTION

A common drive unit for work vehicles, such as skid steer loaders, is a hydrostatic drive unit. Hydrostatic drive units are advantageous because they are capable of providing a range of different speeds without the need for mechanical gearing assemblies. Typically, hydrostatic drive units include a hydraulic pump or pumps which are powered by the engine of the work vehicle. The engine may be, for example, a conventional diesel or gasoline engine having a flywheel which turns the pump. Thus, the pump speed and the corresponding fluid flow rate are directly proportional to the engine speed.

In most instances, the hydraulic pump has a displacement chamber for hydraulic fluid. The fluid flow is controlled by the angular position of a swashplate the pump, which controls the effective length of the displacement chamber. The effective length a the displacement chamber, in turn, regulates the hydraulic fluid flow produced by the pump. As is generally understood, the pump may be fluidly connected to hydraulic devices, such as hydraulic cylinders, for driving various actuators, such as lift arms or ground stabilizers, attached to the work vehicle. In addition, the hydraulic pump may be fluidly connected to a drive motor. The fluid flow from the pump causes the drive motor to rotate the axles, which drive the wheels and, thus, the work vehicle. Typically, a separate motor is provided for the right-side and left-side wheels of a work vehicle, with each motor being fluidly connected to a separate hydraulic pump. As such, the speed of the right-side and left-side wheels may he independently controlled for improved performance of the work vehicle.

Typically, a hydrostatic drive unit is controlled by either a closed-loop control system or an open-loop control system. With closed-loop control systems, the system automatically maintains the displacement of the pump at a fixed swashplate position (that is proportional to the control input provided by the operator) regardless of the loading condition of the work vehicle. As such, closed-loop control systems typically provide enhance vehicle controllability and performance. However, due to the automatic correction of the swashplate position, closed-loop control systems fail to provide the operator with any operational feedback (e.g., reduced vehicle speed) as loads on the vehicle increase. In contrast, open-loop control systems are load-sensitive and, thus, provide the desired "feeling" of heavy and/or light loads. For example, open-loop control systems are often designed such that, when loads on the vehicle increase, the swashplate automatically de-strokes, thereby providing the operator a tactile indication of the increased loads (i.e., due to the reduction in vehicle speed). However, depending on the operational efficiency of the pump, such de-stroking of the swashplate typically results in a substantial loss in the vehicle's productivity and/or controllability.

Accordingly, a system and method for controlling a hydrostatic drive unit of a work vehicle that can provide the advantages of both closed- and open-loop control systems would be welcomed in the technology.

BRIEF DESCRIPTION OF THE INVENTION

Aspects and advantages of the invention will be set forth in part in the following description, or may be obvious from the description, or may be learned through practice of the invention.

In one aspect, the present subject matter is directed to a method for controlling a hydrostatic drive unit of a work vehicle. The method may generally include determining a reference swashplate position of a hydraulic pump of the hydrostatic drive unit, wherein the reference swashplate position is associated with an uncompensated current command, and determining an actual swashplate position of the hydraulic pump, wherein the actual swashplate position differs from the reference swashplate position due to a loading condition of the work vehicle. In addition, the method may include determining a closed-loop current command based at least in part on the actual and reference swashplate positions and generating a modified current command based on at least one of the uncompensated current command or the closed-loop current command. The modified current command may differ from the closed-loop current command when an operator input is within a predetermined control input range and may be equal to the closed-loop current command when the operator input is outside the predetermined control input range.

In another aspect, the present subject matter is directed to a system for controlling a hydrostatic drive unit of a work vehicle. The system may include an input device configured to provide an operator input associated with an uncompensated current command. The system may also include a hydraulic pump and a sensor associated with the hydraulic pump. The sensor may be configured to monitor an actual swashplate position of the hydraulic pump. In addition, the system may include a controller communicatively coupled to the input device and the sensor. The controller may be configured to both determine a reference swashplate position for the hydraulic pump based on the uncompensated current command and determine a closed-loop current command based at least in part on the actual and reference swashplate position. The controller may be further configured to generate a modified current command based on at least one of the uncompensated current command or the closed-loop current command. The modified current command may differ from the closed-loop current command when the operator input is within a predetermined control input range and may be equal to the closed-loop current command when the operator input is outside the predetermined control input range.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG. 1 illustrates a side view of one embodiment of a work vehicle;

FIG. 2 illustrates a top, schematic view of various components of the work vehicle shown in FIG. 1, including a hydrostatic drive unit of the work vehicle;

FIG. 3 illustrates a schematic view of one embodiment of a control system for controlling a hydrostatic drive unit of a work vehicle in accordance with aspects of the present subject matter;

FIG. 4 illustrates a graph providing example operating curves for a hydraulic pump of a hydrostatic drive unit;

FIG. 5 illustrates one embodiment of a control system diagram for modifying a current command supplied to a hydrostatic drive unit in accordance with aspects of the present subject matter;

FIG. 6 illustrates a graph providing one example of exemplary correction factor values that may be used in modifying a current command supplied to a hydrostatic drive unit in accordance with aspects of the present subject matter;

FIG. 7 illustrates a graph providing another example of exemplary correction factor values that may be used in modifying a current command supplied to a hydrostatic drive unit in accordance with aspects of the present subject matter;

FIG. 8 illustrates a graph providing a further example of exemplary correction factor values that may be used in modifying a current command supplied to a hydrostatic drive unit in accordance with aspects of the present subject matter;

FIG. 9 illustrates a graph providing one example of a data correlation that may be used to determine an anti-stall current compensation in accordance with aspects of the present subject matter; and FIG. 10 illustrates a flow diagram of one embodiment of a method for controlling a hydrostatic drive unit of a work vehicle in accordance with aspects of the present subject matter.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Referring now to the drawings, FIGS. 1 and 2 illustrate different views of one embodiment of a work vehicle 10. Specifically, FIG. 1 illustrates a side view of the work vehicle 10 and FIG. 2 illustrates a top, schematic view of various components of the work vehicle 10 shown in FIG. 1. As shown, the work vehicle 10 is configured as a skid steer loader. However, in other embodiments, the work vehicle 10 may be configured as any other suitable work vehicle known in the art, such as various agricultural vehicles, earth-moving vehicles, road vehicles, all-terrain vehicles, off-road vehicles and/or the like.

As shown, the work vehicle 10 includes a pair of front wheels 12, 14, a pair of rear wheels 16, 18 and a chassis 20 coupled to and supported by the wheels 12, 14, 16, 18. An operator's cab 22 may be supported by a portion of the chassis 20 and may house various input devices, such as a speed control joystick 24 and an engine speed throttle 25, for permitting an operator to control the operation of the work vehicle 10. In addition, the work vehicle 10 may include an engine 26 and a hydrostatic drive unit 28 coupled to or otherwise supported by the chassis 20. Moreover, as shown in FIG. 1, the work vehicle may include a pair of loader arms 30 coupled between the chassis 20 and a bucket 32 or other suitable implement. Hydraulic cylinders 34 may also be coupled between the chassis 20 and the loader arms 30 and between the loader arms 30 and the bucket 32 to allow the bucket 30 to be raised/lowered and/or pivoted relative to the loader arms 30.

As particularly shown in FIG. 2, the hydrostatic drive unit 28 of the work vehicle 10 may include a pair of hydraulic motors (e.g., a first hydraulic motor 36 and a second hydraulic motor 38), with each hydraulic motor 36, 38 being configured to drive a pair of wheels 12, 14, 16, 18. For example, the first hydraulic motor 36 may be configured to drive the left-side wheels 12, 16 via front and rear axles 40, 42, respectively. Similarly, the second hydraulic motor 38 may be configured to drive the right-side wheels 14, 18 via front and rear axles 40, 42, respectively. Alternatively, the motors 36, 38 may be configured to drive the wheels 12, 14, 16, 18 using any other suitable means known in the art. For instance, in another embodiment, the motors 36, 38 may be coupled to the wheels via a suitable sprocket/chain arrangement (not shown) as opposed to the axles 40, 42 shown in FIG. 1.

Additionally, the hydrostatic drive unit 28 may include a pair of hydraulic pumps (e.g., a first hydraulic pump 44 and a second hydraulic pump 46) driven by the engine 26, which may, in turn, supply pressurized fluid to the motors. For example, as shown in FIG. 2, the first hydraulic pump 44 may be fluidly connected to the first motor 36 (e.g., via a suitable hydraulic hose or other fluid coupling 48) while the second hydraulic pump 46 may be fluidly connected to the second motor 38 (e.g., via a suitable hydraulic hose or other fluid coupling 48). As such, by individually controlling the operation of each pump 44, 46, the speed of the left-side wheels 12, 16 may be regulated independent of the right-side wheels 14, 18.

It should be appreciated that the configuration of the work vehicle 10 described above and shown in FIG. 1 is provided only to place the present subject matter in an exemplary field of use. Thus, it should be appreciated that the present subject matter may be readily adaptable to any manner of work vehicle configuration.

Referring now to FIG. 3, a control system 100 for controlling various components of a hydrostatic drive unit 28 of a work vehicle 10 is illustrated in accordance with aspects of the present subject matter. As shown, the control system 100 includes a controller 102 configured to electronically control various aspects of the drive unit's operation. In general, the controller 102 may comprise any suitable processor-based device known in the art. Thus, in several embodiments, the controller 102 may include one or more processor(s) and associated memory device(s) configured to perform a variety of computer-implemented functions. As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. Additionally, the memory device(s) of the controller 102 may generally comprise memory element(s) including, but are not limited to, computer readable medium (e.g., random access memory (RAM)), computer readable non-volatile medium (e.g., a flash memory), a floppy disk, a compact disc-read only memory (CD-ROM), a magneto-optical disk (MOD), a digital versatile disc (DVD) and/or other suitable memory elements. Such memory device(s) may generally he configured to store suitable computer-readable instructions that, when implemented by the processor(s), configure the controller 102 to perform various computer-implemented functions, such as the control methodologies shown in FIG. 5 and/or the method 400 described below with reference to FIG. 10. In addition, the controller 102 may also include various other suitable components, such as a communications circuit or module, one or more input/output channels, a data/control bus and/or the like.

It should be appreciated that the controller 102 may correspond to an existing controller of the work vehicle 10 (e.g., an existing engine and/or drive unit controller) or the controller 102 may correspond to a separate processing device. For instance, in one embodiment, the controller 102 may form all or part of a separate plug-in module that may be installed within the work vehicle 10 to allow for the disclosed system and method to be implemented without requiring additional software to be uploaded onto existing control devices of the vehicle 10.

As shown in FIG. 3, the controller 102 may be communicatively coupled to various components for controlling the operation of the hydraulic pumps 44, 46 (and, thus, the hydraulic motors 36, 38). Specifically, the controller 102 is shown in the illustrated embodiment as being coupled to suitable components for controlling the operation of the first hydraulic pump 44 and the first hydraulic motor 36, thereby allowing the controller 102 to electronically control the speed of the left-side wheels 12, 16. However, it should be appreciated that the controller 102 may also be communicatively coupled to similar components for controlling the operation of the second hydraulic pump 46 and the second hydraulic motor 38, thereby allowing the controller 102 to electronically control the speed of the right-side wheels 14, 18.

As indicated above, the hydraulic pump 44 may be driven by the engine 26 and may be fluidly connected to the hydraulic motor 36 via suitable fluid couplings 48 (e.g., hydraulic hoses). The hydraulic motor 36 may, in turn, drive the left-side wheels 12, 16 of the vehicle. In several embodiments, the motor 36 may be configured as a fixed displacement motor while the hydraulic pump 44 may be configured as a variable displacement pump. Accordingly, to change the rotational speed of the motor 36 (and, thus, the rotational speed of the wheels 12, 16), the displacement of the hydraulic pump 44 may be varied by adjusting the position or angle of a swashplate (indicated by the arrow 104) of the pump 44, thereby adjusting the flow of hydraulic fluid to the motor 36.

To electronically control the displacement of the swashplate 104, the controller 102 may be commutatively coupled to suitable pressurize regulating valves 106, 108 (PRVs) (e.g., solenoid-activated valves) configured to regulate the pressure of hydraulic fluid supplied to a control piston 110 of the pump 44. Specifically, as shown schematically in FIG. 3, the controller 102 may be coupled to both a forward PRV 106 configured to regulate the pressure of the hydraulic fluid supplied to a forward chamber 112 of the control piston 110 and a reverse PRV 108 configured to regulate the pressure of the hydraulic fluid supplied to a reverse chamber 114 of the control position 110. By pressurizing the forward chamber 112, the swashplate 104 of the pump 44 may be displaced such that hydraulic fluid flows through the fluid loop defined by the hydrostatic drive unit 28 in a manner that causes the motor 36 to drive the wheels 12, 16 in the forward direction. Similarly, by pressurizing the reverse chamber 114, the swashplate 104 may be displaced such that hydraulic fluid flows through the fluid loop in a manner that causes the motor 36 to drive the wheels 12, 16 in the reverse direction.

As is generally understood, the current supplied to the PRV 106, 108 is directly proportional to the pressure supplied to the chamber 112, 114, the pressure difference of which is, in turn, directly proportional to the displacement of the swashplate 104. Thus, for example, by increasing the current command to the forward PRV 106 by a given amount, the pressure within the forward chamber 112 and, thus, the angle of the swashplate 104 may be increased by a proportional amount(s). As the angle of the swashplate 104 is increased, the flow of hydraulic fluid supplied to motor 36 is similarly increased, thereby resulting in an increase in the rotational speed of the wheels 12, 16 in the forward direction. A similar control strategy may be used to increase the rotational speed of the wheels 12, 16 in the reverse direction by increasing the current command supplied to the reverse PRV 108.

In addition, the current command provided by the controller 102 to the PRV (either PRV 106 or PRV 108 depending on the direction of travel) may be directly proportional to the operator input provided by the operator via a suitable input device. For example, as shown in FIG. 3, in one embodiment, the work vehicle 10 may be provided with a joystick 24 for providing operator inputs associated with the current command to be provided to the PRV 106, 108. In such an embodiment, the direction that the joystick 24 is moved by the operator (e.g., forward or back) may determine which PRV (e.g., the forward PRV 106 or the reverse PRV 108) is to receive a current command from the controller 102 while the magnitude of the movement of the joystick 24 (e.g., by moving the joystick to a 20%, 50% or 100% joystick position) may determine the magnitude of the current supplied to the PRV 106, 108. For example, as the joystick position is increased in the forward direction, the current supplied to the forward PRV 106 may be correspondingly increased, thereby increasing both the pressure within the forward chamber 112 and the swashplate angle (and, thus, the rotational speed of the motor 36). Accordingly, by providing operator inputs via the joystick 24, the operator may automatically control the speed of the work vehicle 10.

During operation of the work vehicle 10, the swashplate 104 may attempt to de-stroke (i.e., decrease its angular position) to accommodate increasing load conditions on the vehicle 10. For example, when a resistant torque is applied to the motor 36, the motor RPM is reduced, thereby causing an increase in the loop pressure of the hydraulic drive unit 28. The pump 44 responds to such an increase in loop pressure by de-stroking. For example, if the hydraulic pump 44 is operating at a 100% swashplate angle when the loads acting on the vehicle increase, the swashplate 104 may tend to de-stroke to a lower swashplate angle (e.g., a 50% swashplate angle). As will be described below, the disclosed control methodology may be utilize to control the amount of de-stroke of the swashplate. Specifically, in several embodiments, the control system 100 may be configured to implement purely closed-loop control at lower and/or higher swashplate angles and purely open-loop control at intermediate swashplate angles. In addition, the control system 100 may be configured to implement a combination of closed-loop and open-loop control (i.e., semi-closed-loop control or semi-open-loop control) at swashplate angles in-between. As such, the disclosed control system 100 may be capable of providing the performance/operational advantages associated with both closed-loop and open-loop control.

It should be appreciated that the control system 100 may also include various sensors for monitoring the operating parameters of one or more of the components of the work vehicle 10. For example, as shown in FIG. 3, the control system 100 may include one or more swashplate sensors 116 associated with the pump 44 to allow the controller 102 to monitor the position of the swashplate 104. Specifically, in several embodiments, the swashplate sensor(s) 116 may be configured to measure the current angle of the swashplate 116. The measurements signals generated by the sensor(s) 116 may then be transmitted to the controller 102 for subsequent storage and/or analysis.

Additionally, as shown in FIG. 3, the control system 100 may also include one or more engine speed sensor(s) 118 associated with the engine 26. In general, the sensor(s) 118 may be configured to measure the current RPM of the engine 26 (i.e., erpm). The measurement signals generated by the sensor(s) 118 may then be transmitted to the controller 102 for subsequent storage and/or analysis.

It should also be appreciated that the controller 102 may be configured to receive operator inputs from various input devices in addition to the vehicle speed joystick 24. For example, as shown in FIG. 3, the controller 102 may be configured to receive operator inputs from an engine speed throttle 25. Such operator inputs may be associated with a desired erpm. Accordingly, based on the operator inputs received from the throttle 25, the controller 102 may transmit suitable control signals to an engine governor (not shown) of the engine 26 to allow the erpm to be regulated based on the operator inputs.

Referring now to FIG. 4, a graph depicting the effect of the disclosed control methodology on the amount of de-stroke of the swashplate 104 is illustrated in accordance with aspects of the present subject matter. As shown, the graph illustrates example operating curves (e.g., a minimum load curve 120, a runway load curve 121 and an increased load curve 122) for a conventional hydraulic pump (e.g., pump 44, 46), with the swashplate angle (in terms of the percentage of the maximum swashplate angle) being charted along the y-axis and the current supplied to the appropriate PRV (106 or 108 depending on the direction of travel) being charted along the x-axis. The minimum load curve 120 may generally correspond to the operation of the hydraulic pump 44, 46 when the vehicle 10 is operating at minimum load conditions (e.g., when the vehicle 10 is traveling on concrete with no implement loads). The runaway load curve 121 may generally correspond to the operation of the hydraulic pump 44, 46 when the vehicle 10 is operating in runaway load conditions in which the loop pressure within the hydrostatic unit 28 is negative (e.g., when the vehicle 10 is going downhill). Similarly, the increased load curve 122 may correspond to the operation of the hydraulic pump 44, 46 when the loads acting on the vehicle 10 have increased above the minimum loading condition (e.g., when the vehicle 10 is operating in significantly high load conditions, such as when the vehicle 10 is driving through a swamp or when the bucket 32 is being pushed into a rubble pile).

It should be appreciated by those of ordinary skill in the art that a given pump may generally include a plurality of different "increased load curves" corresponding to different hydrostatic loop pressures (i.e., the pressure of the hydraulic fluid supplied between the pump and the motor). For example, the minimum load curve 120 may correspond to the pump's operation when the loop pressure within the hydrostatic drive unit 26 is at a minimum operating pressure. As the loop pressure is increased with increasing vehicle loads, the pump operation may transition from the minimum load curve 120 to one of a plurality of different increased load curves 122. However, to simplify the disclosure provided herein, the operation of the pump 44, 46 is being described only in terms of its minimum load curve 120 and one of its increased load curves 122.

As shown in FIG. 4, when the vehicle 10 is operating at minimum load conditions, the swashplate angle (along with vehicle speed) may begin increasing at a given current input (i.e., at point 124) and may continue to increase along the minimum load curve 120 as the current input is increased until a 100% swashplate angle is reached (i.e., at point 126). However, when the vehicle 10 is operating in increased loading conditions, the pump operation may vary significantly depending on whether closed-loop or open-loop control is being implemented. Specifically, using closed-loop control, the pump operation is maintained along the minimum load curve 120 despite any increases in vehicle loading. For example, closed-loop control systems typically utilize an internal mechanism within the pump 44, 46 to maintain the swashplate 104 at the angle associated with the current command provided by the operator (e.g., via the joystick 24), thereby preventing any de-stroke of the swashplate.

In contrast, open-loop control systems provide load sensitivity and, thus, operation of the pump 44, 46 is not maintained along the minimum load curve 120. For example, if the vehicle operation is being initiated from a zero speed while increased loading conditions exist, the pump operation may be entirely along the increased load curve 122. Thus, as shown in FIG. 4, the swashplate angle (along with the vehicle speed) may begin increasing at a given current input (i.e., at point 128) and may continue to increase along the increase load curve 122 as the current input is increased until a 100% swashplate angle is reached (i.e., at point 130). However, there may be instances in which the vehicle operation quickly changes from the minimum load condition to an increased load condition. For example, it may be assumed that the vehicle 10 is operating at a 100% swashplate angle at the minimum load conditions immediately prior to the vehicle loads increasing (e.g., due to the bucket 32 being pushed into a rubble pile). With an open-loop control system, since the current command is not automatically adjusted to accommodate for the increase in loads (as is done with closed-loop control systems), the swashplate 104 would de-stroke by a significant amount (e.g., from point 126 to point 132), thereby resulting in a large reduction in the vehicle speed. To return the vehicle 10 back to its initial speed, the operator would then have to adjust the joystick position to increase the current command, thereby increasing the swashplate angle along the increased load curve 122 from point 132 to point 130.

As indicated above, certain advantages and disadvantages are typically associated with closed-loop and open-loop control systems. For example, closed-loop control is typically more accurate than open-loop control and, thus, allows for increase vehicle controllability and productivity. However, by completely preventing de-stroke of the swashplate 104 at increased loading conditions, closed-loop control systems fail to provide the operator with the desired "feeling" or operational feedback associated with increased loads, in contrast, open-loop control systems allow the swashplate 104 to de-stroke with increased loads, thereby providing the operator with the desired "feeling" or operational feedback. However, the amount of de-stroke allowed is often quite substantial. As a result, purely open-loop control systems tend to be too sensitive to load changes. Moreover, to accommodate the large current range (e.g., range 134 of FIG. 4) that is required to operate the vehicle 10 along the various operating curves associated with open-loop control (e.g., curves 120, 121, 122), there is a large saturation zone in the current command, thereby decreasing both the joystick resolution and the overall controllability of the vehicle 10. For example, in the illustrated embodiment, the current required at the initiation of the runaway load curve (i.e., point 180) may correspond to a 0% joystick position while the current required at the end of the increase load curve (i.e., point 130) may correspond to a 100% joystick position. Thus, for normal operation, a large amount of saturation may be present hi the joystick control.

In accordance with aspects of the present subject matter, the disclosed control methodology utilizes a combination of both closed-loop and open-loop control to allow for the advantages of both control mechanisms to be exploited while minimizing the effect of the disadvantages associated with such control mechanisms. Specifically, in several embodiments, the controller 102 may be configured to implement closed-loop control, open-loop control and/or a combination of both depending on the control input provided by the operator (i.e., based on the joystick position), which, as indicated above, changes the current command provided to the PRV 106 or 108. For example, a desired operating curve 135 for a hydraulic pump 44, 46 is shown in FIG. 4, which corresponds to the desired pump operation when the vehicle 10 is operating at the increased loading conditions associated with the increased load curve 122. As shown, at swashplate angles near the minimum swashplate angle (e.g., at a given current or joystick position range 136) and at swashplate angles near the maximum swashplate angle (e.g., at a given current or joystick position range 138), the controller 102 may be configured to implement purely closed-loop control. Similarly, at a given set of intermediate swashplate angles (e.g., at a given current or joystick position range 140), the controller 102 may be configured to implement purely open-loop control. Additionally, the controller 102 may be configured to implement a combination of closed-loop and open-loop control (i.e., semi-closed-loop control or semi-open-loop control) as the pump's operation is transitioned from closed-loop control to open-loop control (e.g., along current or joystick position range 142) and as the pump's operation is transitioned from open-loop control back to closed-loop control (e.g., along current or joystick position range 144).

Thus, as shown in FIG. 4, at increased loading conditions for the work vehicle 10, the pump's operation may he initially maintained along the minimum load curve 120 for a given range 136 of joystick positions (or current commands) by implementing closed-loop control (e.g., from point 124 to point 146). As the current command is increased by increasing the joystick position, the controller 102 may transition from closed-loop control to open-loop control (e.g., from point 146 to point 148) and then implement open-loop control for a given range 140 of joystick positions (or current commands) (e.g., from point 148 to point 150) before transitioning back to closed-loop control (e.g., from point 150 to point 152). As the current command is again increased by further increasing the joystick position, closed-loop control may be implemented to maintain the pump's operation along the minimum load curve 120 for a range 138 of higher joystick positions (or current commands) (e.g., from point 152 to point 126).

By implementing such a control methodology, numerous performance advantages may be obtained. For example, by implementing closed-loop control at lower and higher joystick positions (i.e., at lower and higher swashplate angles and, thus, higher and lower vehicle speeds) and by slowly transitioning between closed-loop control and open-loop control across a range of joystick positions (e.g., ranges 142, 144), the controllability and/or performance of the vehicle 10 may be significantly higher than what could be obtained by implementing purely open-loop control along such joystick positions. Similarly, by implementing open-loop control at certain intermediate joystick positions (e.g., range 140) and by slowly transitioning between closed-loop control and open-loop control across a range of joystick positions (e.g., ranges 142, 144), operators may be provided with the desired "feeling" or operational feedback associated with increased vehicle loads.

For example, the saturation typically present in the joystick control may be reduced significantly by implementing the disclosed methodology, thereby increasing the joystick resolution. Specifically, as shown in FIG. 4, in one embodiment, the joystick control may be adapted so that the current required at the initiation of the minimum load curve 120 and the desired operating curve 135 (i.e., point 124) may correspond to a 0% joystick position while the current required at the end of such curves 120, 135 (i.e., point 126) may correspond to a 100% joystick position. Thus, as opposed to the joystick position range 134, a joystick position range 182 may be defined that is tailored to the pump's operation, thereby eliminating any saturation present in the joystick control. However, in other embodiments, it may be desirable to have a given amount of saturation present in the joystick control. Thus, it should be appreciated that the joystick control may be adapted so that the 0% joystick position corresponds to any suitable current command (e.g., a current between points 180 and 124) and the 100% joystick position corresponds to any suitable increased current command (e.g., a current between points 126 and 130).

Referring now to FIG. 5, one embodiment of a control system diagram for implementing the disclosed control methodology is illustrated in accordance with aspects of the present subject matter. As shown in FIG. 5, an uncompensated current command (box 200) may be initially generated that corresponds to the current command to be provided by the controller 102 based on the operator input provided via the joystick 24. As described above, this current command 200 may correlate to a given swashplate angle or position based on the loading condition of the work vehicle 10. Thus, as shown in FIG. 5, in several embodiments, the uncompensated current command 200 may be correlated to a reference swashplate position (box 202) corresponding to the expected swashplate angle for the pump 44, 46 (given the uncompensated current command 200) at the minimum load condition. For instance, referring back to FIG. 4, if the uncompensated current command 200 corresponds to the current associated with line 154, the reference swashplate position 202 may be equal to a 100% swashplate angle (i.e., at point 126). This reference swashplate position 202 may then be input into summing circuit 204.

It should be appreciated that, in several embodiments, the reference swashplate position 202 may be determined by using a look-up table or other suitable data table/correlation stored within the controller's memory. For example, the look-up table may include reference swashplate positions 202 (corresponding to the various swashplate positions shown in FIG. 4 along the minimum load curve 120) for each current command that may be generated by the controller 102. Thus, for each uncompensated current command 200, the look-up table may be utilized to determine the corresponding reference swashplate position 202.

As shown in FIG. 5, at the summing circuit 204, the reference swashplate position 202 may be compared to an actual swashplate position (box 206), which may be determined by the controller 102 using the swashplate angle measurements provided by the swashplate sensor 116 (FIG. 3). Thus, the output of the summing circuit 204 may be the difference between the reference swashplate position 202 and the actual, monitored position 206 of the swashplate 104. This output may then be input into a control loop feedback mechanism. For example, as shown in the illustrated embodiment, the control loop feedback mechanism is a proportional-integral-derivative controller (PID controller) (box 208). However, in other embodiments, the control loop feedback mechanism may correspond to any other suitable closed-loop feedback mechanism known in the art.

As is generally understood, PID controllers may be utilized to determine the adjustment needed to one or more process control inputs in order to minimize the error between a measured process variable and a desired set-point. Thus, in terms of the present subject matter, the disclosed PID controller 208 may he configured to determine suitable process control inputs for minimizing the error between the actual swashplate position 206 and the reference swashplate position 202. In other words, the PID controller 208 may be configured to calculate the required current command needed to maintain the pump operation along the minimum load curve 120 (i.e., to minimize swashplate de-stroke). Thus, the output of the PID controller 208 (hereinafter referred to as the "closed-loop current command 210") corresponds to the current command needed for closed-loop control of the pump 44, 46.

As shown in FIG. 5, prior to inputting the uncompensated current command 200 and the closed-loop control command 210 into summing circuit 212, the current commands 200, 210 may he modified by correction factors. Specifically, as shown in the illustrated embodiment, the uncompensated current command may be modified by correction factor "A" (box 214) to generate a corrected current command 215 and the closed-loop current command may be modified by correction factor "B" (box 216) to generate a corrected current command 217. The correction factors 214, 216 (A and B) may generally correspond to weighted coefficients that, when multiplied by the current commands 200, 210, determine whether the pump control implemented by the controller 102 is purely closed-loop control, purely open-loop control or a combination of a both closed-loop and open-loop control. For example, in several embodiments, the correction factors 214, 216 (A and B) may correspond to values ranging from one to zero, with the sum of both correction factors being equal to one at any given instance (i.e., correction factor 214 (A)+correction factor 216 (B)=1). Thus, to provide purely closed-loop control, the correction factor 214 (A) may be set to zero and the correction factor 216 (B) may be set to one, thereby ensuring that the output of the summing circuit 212 is equal to the closed-loop current command 210 (i.e., the current required to minimize the error between the reference and actual swashplate positions 202, 206). Similarly, to provide purely open-loop control, the correction factor 214 (A) may be set to one and the correction factor 216 (B) may be set to zero, thereby ensuring that the output of the summing circuit 212 is equal to the uncompensated current command 200. Moreover, by the setting the correction factors 214, 216 (A and B) to values between one and zero (with the sum of such values equal to one) a combination of closed-loop and open-loop control may be achieved.

As indicated above, the type of control being implemented by the controller 102 may depend primarily on the control input being currently provided by the operator. Thus, in several embodiments, the values set for the correction factors 214, 216 (A and B) may be determined with reference to the current joystick position. For example, FIG. 6 illustrates an example of how the values for the correction factors 214, 216 may be varied between zero and one based on the joystick position. As shown, at a given range of lower joystick positions (e.g., range 136) and at higher joystick positions (e.g., range 138), the value for correction factor 214 (A) may be set to zero and the value for correction factor 216 (B) may be set to one, thereby providing for closed-loop control of the pump 44, 46. Thus, as shown in FIG. 4, the operation of the pump 44, 46 may be maintained along the minimum load curve 120 for such joystick position ranges 136, 138. Similarly, at given set of intermediate joystick positions (e.g., range 140), the value for correction factor 214 (A) may be set to one and the value for correction factor 216 (B) may be set to zero, thereby providing for open-loop control of the pump 44, 46. Thus, as shown in FIG. 4, the pump 44, 46 may operate along the increased load curve 122 for such an intermediate joystick position range 140.

Moreover, as shown in FIG. 6, the values set for the correction factors 214, 216 (A and B) may be greater than zero and less than one for the: joystick positions at which the pump control is being transitioned from closed-loop to open-loop control (e.g., range 142) and from open-loop to closed-loop control (e.g., at range 144). Specifically, as the pump control transitions from closed-loop to open-loop control (e.g., along range 142), the value set for the correction factor 216 (B) may be gradually decreased as the value set for the correction factor 214 (A) is gradually increased so as to provide for a smooth transition between the two different control strategies. Similarly, as the pump control transitions from open-loop to closed-loop control (e.g., along range 144), the value set for the correction factor 216 (B) may be gradually increased as the value set for the correction factor 214 (A) is gradually decreased, again providing for a smooth transition between two control strategies.

It should be appreciated that the specific joystick position ranges at which the correction factors 214, 216 (A and B) are set to zero, one and values in-between may generally vary depending on the desired operation of the pump 44, 46 and the desired resolution of the joystick control. For example, in the illustrated embodiment, the values for the correction factors 214, 216 (A and B) have been selected such that closed-loop control is implemented at joystick positions less than about 10% of the maximum joystick position (i.e., the maximum forward position or the maximum reverse position for the joystick 24) and at joystick positions greater than about 90% of the maximum joystick position. However, in other embodiments, the joystick position ranges for closed-loop control may be larger or smaller than the ranges 136, 138 shown in FIGS. 4 and 6. Similarly, in the illustrated embodiment, the values for the correction factors 214, 216 (A and B) have been selected such that open-loop control is implemented at joystick positions ranging from about 40% to about 60% of the maximum joystick position. However, in other embodiments, the joystick position range for open-loop control may be larger or smaller than the range 140 shown in FIGS. 4 and 6.

Moreover, it should also be appreciated that, in alternative embodiments, the correction factors 214, 216 (A and B) may be set so as to provide any other suitable combination of closed-loop and/or open-loop control. For instance, FIG. 7 illustrates another example of how the values for the correction factors 214, 216 may be varied to adjust the pump control. As shown, similar to the embodiment of FIG. 6, the values for the correction factors 214, 216 (A and B) have been set such that closed-loop control may be implemented for a given range of lower joystick positions (e.g., range 236) and open-loop control may be implemented for a given range of intermediate joystick positions (e.g., range 240). However, for higher joystick positions (e.g., range 244), a combination of closed-loop and open-loop control may be implemented without returning the pump control to purely closed-loop control. Moreover, FIG. 8 illustrates a further example of how the values for the correction factors 214, 216 may be varied to adjust the pump control. As shown, the values for the correction factors 214, 216 (A and B) have been set such that closed-loop control may be implemented for a given range of lower joystick positions (e.g., range 336) and a given range of higher joystick positions (e.g., range 338). However, unlike the embodiments described above, the pump control never transitions to purely-open loop control (i.e., the correction factor 214 (A) is never set to one and the correction factor 216 (B) is never set to zero). As a result, a combination of closed- and open-loop control may be implemented for all joystick positions defined between ranges 336, 338. Of course, it should be appreciated that any other suitable combination of closed-loop and/or open-loop control may be implemented utilizing the disclosure provided herein.

Referring back to FIG. 5, the corrected current command 215 (i.e., the uncompensated current command 200 as modified by the correction factor 214 (A)) and the corrected current command 217 (i.e., the closed-loop current command 210 as modified by the correction factor 216 (B)) may be input into summing circuit 214. In several embodiments, the resulting output (i.e., the modified current command 218) may then be input into summing circuit 220 along with an input from an anti-stall circuit 222 designed to prevent engine stall. Specifically, the output from the anti-stall circuit 222 may be subtracted from the modified current command 218 at summing circuit 220 to allow the final current command 224 to be reduced in instances in which the direct application of the modified current command 218 may result in stalling of the engine 26. However, in other embodiments, the disclosed control methodology may be implemented without inclusion of the anti-stall circuit 222. In such instances, the modified current command 218 may serve as the final current command 224 that is transmitted through the system to adjust the position of the swashplate 104.

In general, the anti-stall circuit 222 may include an anti-stall control function 226 that is configured to determine a suitable anti-stall current compensation 228 based on the difference between the commanded and actual RPM for the engine 26. For example, as shown in FIG. 5, the commanded erpm (box 2.30) associated with the operator input provided by the engine speed throttle 25 (FIG. 3) may be input into summing circuit 232 together with the actual erpm measurement (box 234) provided by the engine speed sensor 118 (FIG. 3). The output of the summing circuit 232 may then be input into the control function 226, which may include a suitable mathematical function or data table that correlates the difference between the commanded and actual erpm values 230, 230 to the anti-stall current compensation 228.

As is generally understood, if the commanded erpm 230 is greater than the actual erpm 234 (thus providing a positive value as the output from the summing circuit 232), the power requirement for the hydrostatic drive unit 28 may be greater than the amount of power that the engine 26 is capable of delivering, thereby increasing the likelihood that the engine 26 stalls (this often occurs at swashplate angles at or near 100% of the maximum swashplate angle). In such instances, the anti-stall current compensation 228 output from the control function 226 may be designed to reduce the modified current command 218 (at summing circuit 220) such that the final current command 224 modifies the operation of the pump 44, 46 in a manner that reduces the overall power requirement of the hydrostatic drive unit 28 to a power level that can be delivered by the engine 26. For instance, FIG. 9 illustrates a graph providing example data correlating the erpm difference between the commanded and actual erpm values 230, 234 to the anti-stall current compensation 228. As shown, the anti-stall current compensation 228 generally increases with increases in the erpm difference, thereby increasing the magnitude at which the final current command 224 is reduced for larger erpm differences and, thus, preventing engine stall.

Referring back to FIG. 5, as indicated above, the modified current command 218 and the anti-stall current compensation 228 may be input into summing circuit 220. The resulting output (i.e., the final current command 224) may then be transmitted to the appropriate PRV 106 or 108 (depending on the current direction of travel) to adjust the chamber pressure within the control position 110 and, thus, appropriately modify the swashplate position to provide the desired pump operation based on the current loading condition of the vehicle 10 (e.g., as described above with reference to FIG. 4).

Referring now to FIG. 10, a flow diagram of a specific embodiment of a method 400 for controlling a hydrostatic drive unit 28 of a work vehicle 10 is illustrated in accordance with aspects of the present subject matter. As shown, at 402 and 404, both a reference position and an actual potion for the swashplate 104 may be determined by the controller 102. As indicated above with reference to FIG. 5, the reference swashplate position 202 may, for example, correspond to the swashplate position that is expected to result when the uncompensated current command (i.e., the current command generated as a function of the joystick position) is applied for a pump 44, 46 operating along its minimum load curve 120 (e.g., at a minimum load condition for the vehicle 10). Similarly, the actual swashplate position may be determined based on the measurement signals received from the swashplate sensor(s) 116.

Additionally, at 406, a closed-loop current command may be determined based at least in part on the actual and reference swashplate positions. For example, as described above with reference to FIG. 5, the closed-loop current command 210 may be calculated using a PID controller 208 or any other suitable control loop feedback mechanism.

Referring still to FIG. 10, at 408, a modified current command may be generated based at least in part on the uncompensated current command and/or the closed-loop current command. For instance, as described above, the uncompensated and closed-loop current commands 200, 210 may be modified using correction factors 214, 216 (A and B) that manipulate the pump control between closed-loop and open-loop control. As shown in FIG. 5, the corrected current commands 215, 217 may then be summed to generate the modified current command 218. This modified current command 218 may then be directly applied to one of the PRVs 106, 108 (depending on the desired direction of travel) to adjust the position of the swashplate 104 or, optionally, the modified current command 218 may be adjusted by an anti-stall current compensation 228 prior to be applied to the appropriate PRV 106, 108.

As indicated above, the modified current command 218 may differ substantially depending on whether closed-loop control, open-loop control or a combination of both is being implemented by the controller 102. For example, as shown in FIG. 4, when the joystick position is within a predetermined control input range (e.g., across the range covered by ranges 140, 142, 144), the modified current command 218 may differ from the current command associated with the minimum load curve 120 for such joystick position, thereby indicating that the pump control being implemented is either open-loop control (e.g., within range 140) or a combination of closed-loop and open-loop control (e.g., within range 142 or range 144). However, when the joystick position is outside such predetermined control input range (e.g., within range 136 or range 138), the modified current command 218 may be equal to the current command for the minimum load curve 120 (i.e., the closed-loop current command 210) for a given joystick position, thereby indicating that the pump control being implemented is purely closed-loop control.

It should be appreciated that, as used herein, the term "predetermined control input range" refers to the range of joystick positions (or the range of any other suitable control inputs being used to control pump operation) across which the pump control being implemented is not purely closed-loop control. For example, in the embodiments shown in FIGS. 6 and 8, the predetermined control input range ranges from about 10% of the maximum joystick position to about 90% of the maximum joystick position. As another example, in the embodiment shown in FIG. 7, the predetermined control input range ranges from about 20% of the maximum joystick position to about 100% of the maximum joystick position. In other embodiments, the predetermined control input range may correspond to any other suitable range of joystick positions (or any other suitable range of control inputs).

It should also be appreciated that any other suitable compensation strategy (e.g., load compensation, RPM compensation, temperature compensation and/or the like) may be utilized in combination with the disclosed control methodology. For example, as shown in FIG. 4, the slope of the minimum load and desired operating curves 120, 135 increases significantly at lower joystick positions (i.e., at lower swashplate angles). For such joystick positions, it may be desirable to utilize a load compensation strategy to smooth the pump's operation.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method for controlling a hydrostatic drive unit of a work vehicle, the method comprising:
   determining, with a processor-based device, a reference swashplate position of a hydraulic pump of the hydrostatic drive unit, the reference swashplate position being associated with an uncompensated current command;
   determining, with the processor-based device, an actual swashplate position of the hydraulic pump, the actual swashplate position differing from the reference swashplate position due to a loading condition of the work vehicle;
   determining, with the, processor-based device, a position error between the actual swashplate position and the reference swashplate position;
   determining, with the processor-based device, a closed-loop current command based at least in part on the position error between the actual and reference swashplate positions;
   adjusting, with the processor-based device, the closed-loop current command based on a first correction factor to generate a first corrected current command;
   adjust, with processor-based device, the uncompensated command based on a second correction factor to generate a second corrected current Command;
   generating, with the processor-based device, a modified current command based on at least one of the first corrected current command or the second corrected current command, wherein the modified current command differs from the closed-loop current command when an operator input is within a predetermined control input range and wherein the modified current command is equal to the closed-loop current command when the operator input is outside the predetermined control input range; and
   controlling, with the processor-based device, a displacement swashplate of the hydraulic pump based on the modified current command.

2. The method of claim 1, wherein the closed-loop current command is determined using a control loop feedback mechanism.

3. The method of claim 2, wherein the control loop feedback mechanism comprises a proportional-integral-derivative (PID) controller.

4. The method of claim 1, wherein the first correction factor corresponds to a value ranging from zero to one.

5. The method of claim 1, wherein the first correction factor is equal to one when the operator input is outside the predetermined control input range and is equal to less than one when the operator input is within the predetermined control input range.

6. The method of claim 1, wherein the second correction factor corresponds to a value ranging from zero to one.

7. The method of claim 1, wherein the second correction factor is equal to zero when the operator input is outside the predetermined control input range and is equal to greater than zero when the operator input is within the predetermined control input range.

8. The method of claim 1, wherein the operator input corresponds to a position of a joystick of the work vehicle.

9. The method of claim 8, wherein the predetermined control input range ranges from 10% of a maximum joystick position to 90% of the maximum joystick position.

10. The method of claim 1, further comprising adjusting the modified current command based on an anti-stall current compensation.

11. A system for controlling a hydrostatic drive unit of a work vehicle, the system comprising:
- an operator-manipulated input device configured to provide an operator input associated with an uncompensated current command;
- a hydraulic pump including a swashplate;
- a sensor associated with the hydraulic pump, the sensor being configured to monitor an actual swashplate position of the swashplate;
- a controller communicatively coupled to the operator-manipulated input device and the sensor, the controller being configured to:
  - determine a reference swashplate position for the swashplate based on the uncompensated current command;
  - determine a position error between the actual swashplate position and the reference swashplate position;
  - determine a closed-loop current command based at least in part on the position error between actual and reference swashplate positions;
  - adjust the closed-loop current command based on a first correction factor to generate a first corrected current command;
  - adjust the uncompensated command based on a second correction factor to generate a second corrected current command;
  - generate a modified current command based on at least one of the first corrected
- current command or the second corrected current command; and
- control a displacement of the swashplate based on the modified current command,
- wherein the modified current command differs from the closed-loop current command when the operator input is within a predetermined control input range and wherein the modified current command is equal to the closed-loop current command when operator input is outside the predetermined control input range.

12. The system of claim 11, wherein the closed-loop current command is determined using a control loop feedback mechanism.

13. The system of claim 11, wherein the first correction factor corresponds to a value ranging from zero to one.

14. The system of claim 11, wherein the first correction factor is equal to one when the operator input is outside the predetermined control input range and is equal to less than one when the operator t is within the predetermined control input range.

15. The system of claim 11, wherein the second correction factor corresponds to a value ranging from zero to one.

16. The system of claim 11, wherein the second correction factor is equal to zero when the operator input is outside the predetermined control input range and is equal to greater than zero when the operator input is within the predetermined control input range.

17. The system of claim 11, wherein the operator-manipulated input device comprises a joystick of the work vehicle, the operator input corresponding to a position of the joystick.

18. The system of claim 11, wherein the controller is further configured to adjust the modified current command based on an anti-stall current compensation.

* * * * *